March 6, 1945.   J. J. FIELDS   2,370,945
DEVICE FOR TESTING RUBBER GLOVES
Filed Aug. 10, 1944

Inventor
James J. Fields
By Frease and Bishop
Attorneys ered Mar. 6, 1945

2,370,945

UNITED STATES PATENT OFFICE 2,370,945

DEVICE FOR TESTING RUBBER GLOVES

James J. Fields, North Canton, Ohio

Application August 10, 1944, Serial No. 548,911

6 Claims. (Cl. 73—37)

The invention relates generally to a device for facilitating the inspection of rubber gloves to locate defects therein, and more particularly to a device for mounting, inflating and illuminating rubber gloves to enable thorough inspection of all parts thereof.

In places where a large number of rubber gloves are used constantly, as in hospitals and dispensaries, it is necessary to inspect each glove every time it is used in order to locate pin holes and like defects therein; otherwise the use of such defective gloves may cause infection.

A common method of inspecting such gloves is to merely grasp the glove at its wrist end and twirl it to fill it with air, after which the air is held in the glove by squeezing its wrist portion, while the glove is inspected for defects. This method is not only tedious but is very inefficient and uncertain, because most or all of the wrist portion is covered and cannot be inspected, and because the glove is not inflated sufficiently to reveal very small pin holes or defects.

Other places requiring inspection of rubber gloves, include rubber glove manufacturing plants, and electric power service companies using lineman's rubber gloves.

It is a general object of the present invention to provide a novel device or apparatus for inflating a rubber glove and for maintaining it in inflated condition while it is being inspected.

Another object is to provide a novel device for inflating a rubber glove and rotatably supporting it in inflated condition to facilitate inspection thereof.

A further object is to provide a novel rubber glove inflating device which is adapted automatically to hold the glove in inflated condition for a substantial period of time.

Another object is to provide a novel rubber glove inflating device which will illuminate the glove in inflated condition.

A still further object is to provide a novel rubber glove inflater which exposes for inspection substantially all of the glove in inflated condition.

Finally, it is an object of the present invention to provide a novel rubber glove inflating device which is simple and inexpensive to manufacture, easily operated by unskilled persons, and which enables more rapid and efficient inspection of rubber gloves than previously has been possible.

These and other objects are accomplished by the parts, improvements, combinations and arrangements comprising the present invention; which is shown in the accompanying drawing forming part hereof, and which is hereinafter described and defined in the appended claims.

Figure 1:
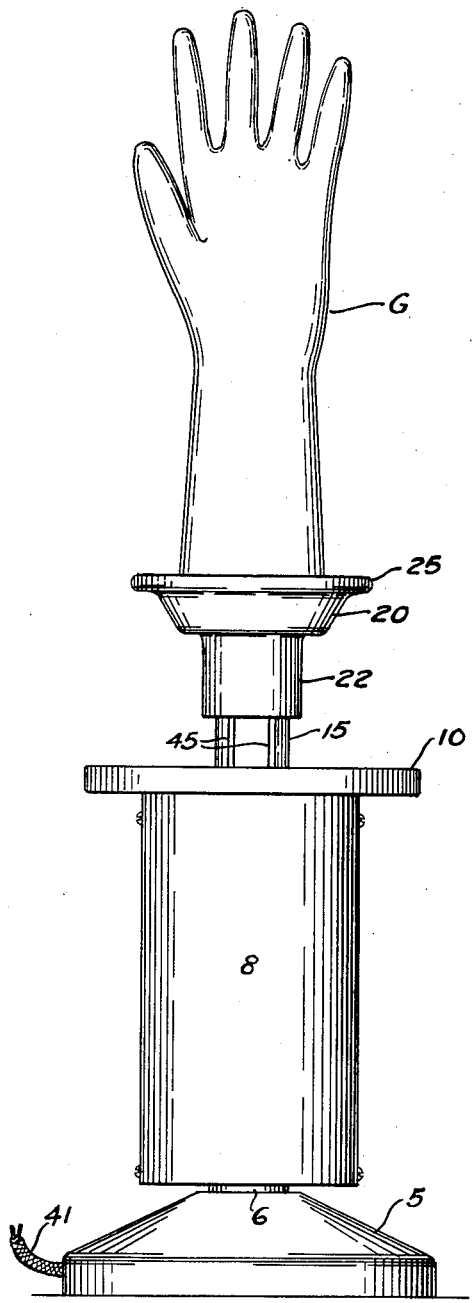
Figure 2:
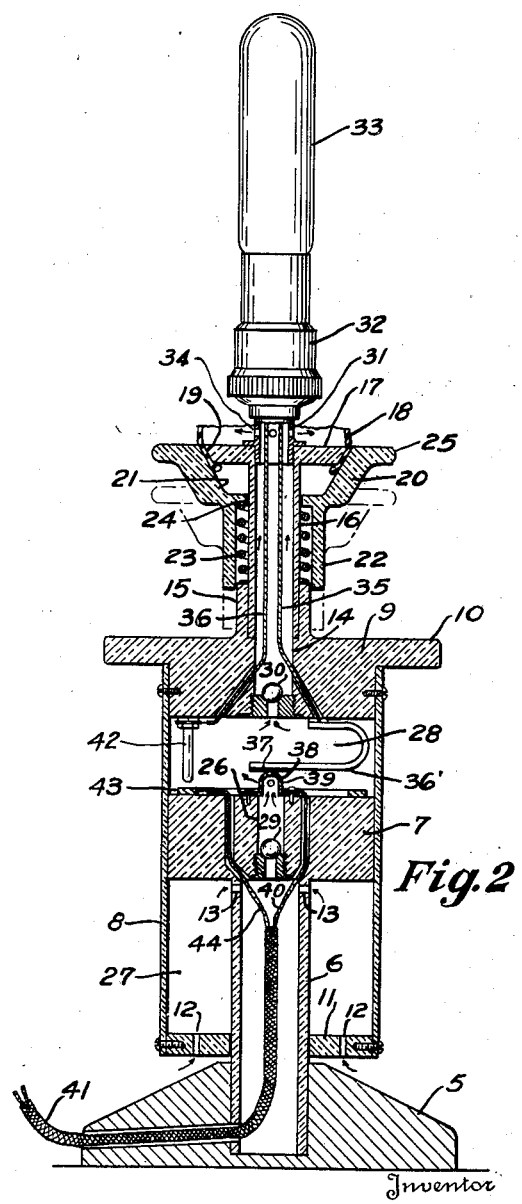

Referring to the drawing, Fig. 1 is an elevational view of the device, showing a rubber glove mounted thereon in inflated condition; and Fig. 2 is a vertical sectional view thereof with the glove partly broken away.

The device includes a base 5 adapted for resting on a table top or the like; and preferably constructed of metal or plastic or other suitable material. A hollow piston-supporting shaft 6 is mounted in the central portion of the base and extends upwardly therefrom, and the upper end of the shaft 6 has an enlarged piston 7 supported therein. The piston 7 is preferably of circular cross-section and may be integral with the shaft 6 or separate therefrom, as desired.

A cylinder 8 is fitted slidably and rotatably around the piston 7 for up and down movement thereon, and the upper end of the cylinder encloses a head 9 which has an outwardly extending flange portion 10. The lower end of the cylinder 8 is provided with an annular plate 11 which fits slidably around the shaft 6 and is provided with air intake ports 12.

The upper end of the shaft 6 is also provided with air intake ports 13 for admitting air into the interior of the shaft.

The head 9 is provided with a central bore or exhaust passage 14 and preferably has an upwardly extending annular flange 15 surrounding said bore. A hollow shaft 16 is located in said annular flange 15 and extends upwardly therefrom for supporting at its upper end a substantially circular piece 17 over which the wrist end portion 18 of a rubber glove G is adapted to be stretched, and the peripheral surface 19 of the piece 17 is preferably inclined or tapered downwardly inward as shown.

A clamping piece 20 engirdles the shaft 16 and is provided with an inner inclined surface 21 which mates with the surface 19 for detachably clamping the end of the glove wrist portion therebetween, and the lower end 22 of the piece 20 is preferably cylindrical and spaced outwardly of the shaft 16 as shown.

Means for yieldingly urging the clamping piece 20 upwardly preferably includes a helical spring 23 which rests on the upper end of the annular flange 15 and engages an annular shoulder 24 within the clamping piece 20. The piece 20 is provided at its upper end with an outwardly extending flange 25, so that when it is desired to clamp the lower end of the glove 18, the flange 25 is pressed downwardly with the fingers to the dot-dash position shown and held there while the end of the glove is stretched over the piece 17, and when the pressure of the fingers is released, the spring 23 forces the piece 20 to the clamping position shown in Fig. 2.

The piston 7 is provided with a central bore or passageway 26 for passing air from the intake chamber 27 of the cylinder 8 to the compression chamber 28 thereof, and an intake ball valve 29 is located in said bore 26 for permitting air to flow upwardly through the bore and for preventing it from flowing downwardly. Similarly air exhaust ball valve 30 is located in the bore 14 of the head 9 for permitting air to flow upwardly through the bore and preventing downward flow of air therethrough.

The piece 17 is preferably provided at its central portion with a tubular socket support 31 which provides communication between the bore 14 and the interior of the glove and which supports an ordinary electric bulb socket 32 in which is screwed an electric bulb 33 which is preferably of the elongated style shown in Fig. 2.

When a glove G has been mounted on the device as shown in Fig. 1, and it is desired to inflate the glove, the operator merely grasps the flange 10 and raises the cylinder 8 with respect to the piston 7, which motion sucks in air through the intake ports 12 and 13 and raises the ball 29 to supply air to the compression chamber 28 to compensate for its increase in volume.

The operator then presses downward on the flange 10 to give the cylinder a return stroke and compress the air in the chamber 28. The compression of the air in chamber 28 closes ball valve 29 and opens ball valve 30 to force air upwardly through the bore 14 and out of exhaust ports 34 provided in the socket support 31, and thus into the glove G to inflate the same. Thus, by reciprocating or pumping the cylinder 8 the glove may be inflated to any desired amount, and is ready for inspection to locate defects.

In order to facilitate the location of very small defects, the electric bulb 33 over which the glove is located, may be illuminated when the glove is inflated. The electric lead wires 35 and 36 are connected to the socket 32 in a usual fashion and passed downwardly through the bore 14 and then through the head 9 around ball valve 30. The lead wire 35 is preferably connected to a metal U-shaped spring 36' which has a contact piece 37 for making contact with a preferably dome-shaped metal contact piece 38 located over the bore 26 of the piston 7 and provided with suitable air ports 39 as shown. Another lead wire 40 is connected to the contact piece 38 and extends therefrom through the piston 7 and into the shaft 6 where it enters the conductor cord 41 which passes through the base 5 and is connected to a source of electric current (not shown).

The lead wire 36 is connected in chamber 28 to a vertical contact pin 42 which, when the contact 37 of the spring 36 rests on the dome 38, is normally spaced a slight distance above a contact ring 43 mounted on top of the piston 7, so that the spring 36 normally prevents closure of the electric circuit to the socket 32.

Thus, when the parts are in the position of Fig. 2 and it is desired to illuminate the bulb 33, the operator merely exerts a slight additional downward or endwise pressure on the flange 10 so as to flex the spring 36' and bring the pin 42 in contact with the ring 43, to which is connected the other lead wire 44 passing into the conductor cord 41. The contact of pin 42 and ring 43 completes the electrical circuit and illuminates the bulb 33, and when the pressure on flange 10 is relieved, the spring 36' immediately breaks the contact.

Accordingly, when the glove G is inflated, the operator can illuminate the glove by exerting the slight pressure on flange 10 and while maintaining that pressure the cylinder 8 and all parts connected thereto including the glove, can be rotated around shaft 6 and piston 7 to any desired position for facilitating inspection of the glove.

When it is desired to remove the glove, the flange 25 of the clamping piece 20 is pressed downwardly against spring 23, and the wrist portion 18 of the glove can then be easily removed. As shown in Fig. 1 the shaft 15 may have vertical flutes 45 therein so as to prevent the accumulation of dirt between the sliding surfaces of the flange 15 and the portion 22 of the clamping piece.

Substantially all of the larger parts such as the piston head, cylinder and clamping valve piece 20 may be made of plastic or other suitable material, and the device is therefore simple and inexpensive to manufacture.

With the improved device, a rubber glove is mounted and inflated in such a manner as to expose substantially all of its surface to a thorough inspection, especially because the glove is illuminated while inflated and can be turned to any convenient position.

Moreover, by using an elongated electric bulb such as 33, each glove finger can be tested separately, because the base of each finger can be pressed against the top of the bulb to seal off the finger from the rest of the glove, so that if there is any leak in that finger it will quickly collapse, since it is not being supplied with air from the remainder of the glove.

I claim:

1. Apparatus for testing rubber gloves including a piston having an air passageway therethrough, a cylinder slidably and rotatably mounted on said piston and having an exhaust passageway for exhausting air from one end of the cylinder, a hollow shaft communicating with said exhaust passage and projecting outwardly from said cylinder, a glove piece on said shaft for fitting within the wrist end of a rubber glove, means comprising a tubular support on said glove piece providing communication between said exhaust passage and the interior of the glove, an electric socket mounted on said tubular support, and means for completing an electric circuit to said socket in response to endwise pressure applied to said cylinder.

2. Apparatus for testing rubber gloves including a piston having an air passageway therethrough, a cylinder slidably and rotatably mounted on said piston and having an exhaust passageway for exhausting air from one end of the cylinder, a hollow shaft communicating with said exhaust passage and projecting outwardly from said cylinder, a glove piece on said shaft for fitting within the wrist end of a rubber glove, a tubular support on said glove piece providing communication between said exhaust passage and interior of the glove, an electric socket on said tubular support, electric circuit means for supplying current to said socket, and spring contact means in said cylinder normally preventing closure of said circuit and adapted to yieldingly close said circuit in response to endwise pressure applied to said cylinder.

3. Apparatus for testing rubber gloves including a piston having an air passageway therethrough, a cylinder slidably and rotatably mounted on said piston and having an exhaust passageway for exhausting air from one end of the cylinder, a hollow shaft communicating with said exhaust passage and projecting outwardly from said cylinder, a glove piece on said shaft for fitting within the wrist end of a rubber glove, spring pressed means for detachably clamping said glove around said glove piece, a tubular support on said glove piece providing communication between said exhaust passage and the interior of the glove, an electric socket on said tubular support, and means for completing an electric circuit to said socket in response to endwise pressure applied to said cylinder.

4. Apparatus for testing rubber gloves including a base, a piston supported on the base and having an air passageway therethrough, an intake valve in said passageway, a cylinder slidably mounted on said piston for axial movement relative thereto and having air intake openings at one end and an air discharge passageway at the other end, a discharge valve in said discharge passageway, means on the discharge end of said cylinder for detachably clamping the wrist end portion of a rubber glove, and means providing communication between the interior of said glove and said air discharge passageway, whereby reciprocation of the cylinder will inflate the glove and the discharge valve will keep it inflated.

5. Apparatus for testing rubber gloves including a piston having an air passageway therethrough, an air intake valve in said passageway, a cylinder slidably mounted on said piston and having air intake openings at one end and an air discharge passageway at the other end, a discharge valve in said discharge passageway, means on the discharge end of said cylinder for detachably clamping the wrist end portion of a rubber glove, spring means for holding said clamping means in glove clamping position, and means on said clamping means providing communication between the interior of said glove and said air discharge passageway, said parts being so constructed and arranged that axial movement of the cylinder on the piston in one direction will force air into the glove and close said intake valve, and movement of the cylinder in the opposite direction will suck air into the cylinder and close the discharge valve to maintain the glove in inflated condition.

6. Apparatus for testing rubber gloves including a base, a piston supported on the base and having an air passageway therethrough, a cylinder slidably and rotatably mounted on said piston for axial movement relatively thereto and having a discharge passageway for discharging air from one end of the cylinder, a hollow shaft communicating with said discharge passageway and projecting upwardly from said cylinder, a glove piece on said shaft for fitting within the wrist end of a rubber glove, and spring pressed means for detachably clamping said glove around said glove piece, whereby reciprocation of the cylinder will inflate the glove, there being valve means in said discharge passageway maintaining the glove in inflated condition.

JAMES J. FIELDS.